United States Patent
Hamaguchi

(10) Patent No.: US 10,015,341 B2
(45) Date of Patent: Jul. 3, 2018

(54) IMAGE FORMING APPARATUS, AND METHOD OF CONTROLLING IMAGE FORMING APPARATUS

(71) Applicant: CANON KABUSHIKI KAISHA, Tokyo (JP)

(72) Inventor: Jun Hamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/618,299

(22) Filed: Feb. 10, 2015

(65) Prior Publication Data

US 2015/0256698 A1    Sep. 10, 2015

(30) Foreign Application Priority Data

Mar. 4, 2014    (JP) .................................. 2014-041943

(51) Int. Cl.
  *H04N 1/00*      (2006.01)
  *H04N 1/32*      (2006.01)

(52) U.S. Cl.
  CPC ..... *H04N 1/00891* (2013.01); *H04N 1/00904* (2013.01); *H04N 1/00917* (2013.01); *H04N 1/32657* (2013.01); *H04N 1/32667* (2013.01); *H04N 2201/0094* (2013.01)

(58) Field of Classification Search
  CPC ........... H04N 1/00891; H04N 1/00904; H04N 1/00917; H04N 1/32667; H04N 1/32657; H04N 2201/0094
  See application file for complete search history.

(56) References Cited

U.S. PATENT DOCUMENTS

| 7,996,665 | B2 | 8/2011 | Kimura et al. |
| 8,031,350 | B2* | 10/2011 | Ohara ................ G03G 15/5004 358/1.13 |
| 8,775,845 | B2 | 7/2014 | Kimura et al. |
| 9,639,045 | B2 | 5/2017 | Okuzono et al. |
| 2007/0234093 | A1* | 10/2007 | Kimura ................ G06F 1/3203 713/323 |

(Continued)

FOREIGN PATENT DOCUMENTS

| CN | 101211269 A | 7/2008 |
| CN | 102833445 A | 12/2012 |

(Continued)

OTHER PUBLICATIONS

Office Action dated Jul. 26, 2017, in Chinese Patent Application No. 201510096774.3.

*Primary Examiner* — Iriana Cruz

(74) *Attorney, Agent, or Firm* — Fitzpatrick, Cella, Harper & Scinto

(57) ABSTRACT

An image forming apparatus is provided with a power supply switch, a control unit configured to transition the image forming apparatus into a suspend state when the power supply switch is turned off by an operation of a user, a device to which a power supply is stopped forcibly when the power supply switch is turned off by the operation of the user, and a notification unit configured to notify the control unit of an error that occurred on the device, and the control unit, in a case where the error is notified of by the notification unit, controls the image forming apparatus to revert from the suspend state and resets the image forming apparatus.

25 Claims, 6 Drawing Sheets

(56) References Cited

U.S. PATENT DOCUMENTS

| | | | | |
|---|---|---|---|---|
| 2008/0180742 A1* | 7/2008 | Koike | ................ | H04N 1/00915 358/1.15 |
| 2011/0037993 A1* | 2/2011 | Lee | ................ | G06F 9/4418 358/1.14 |
| 2013/0308148 A1 | 11/2013 | Hara | | |
| 2014/0025974 A1* | 1/2014 | Suwabe | ................ | G06F 1/3234 713/323 |
| 2014/0368856 A1* | 12/2014 | Yoon | ................ | H04N 1/00896 358/1.13 |

FOREIGN PATENT DOCUMENTS

| | | |
|---|---|---|
| CN | 103428389 A | 12/2013 |
| JP | 2007-293806 A | 11/2007 |

\* cited by examiner

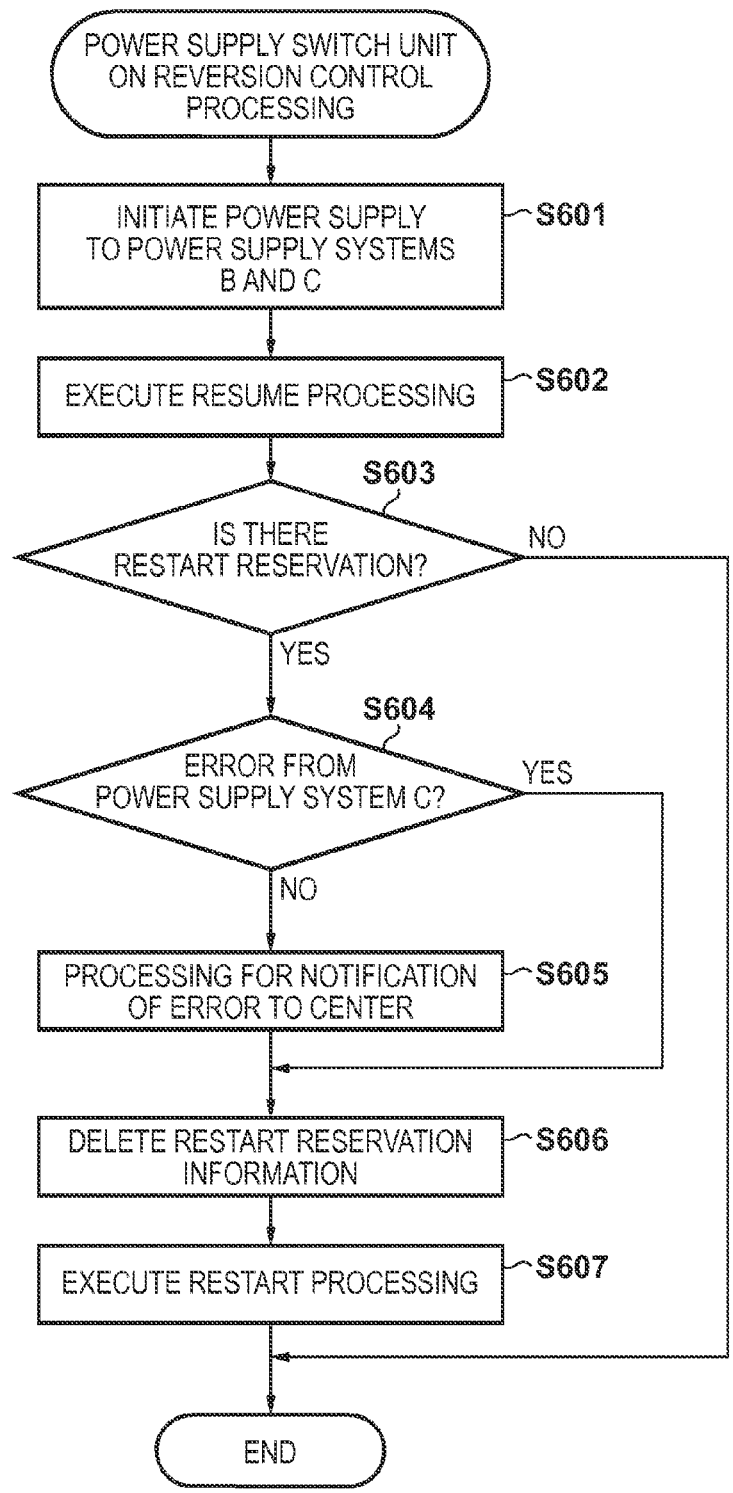

IMAGE FORMING APPARATUS, AND METHOD OF CONTROLLING IMAGE FORMING APPARATUS

BACKGROUND OF THE INVENTION

Field of the Invention

The present invention relates to an image formation technique, and in particular relates to a technique for transitioning into a state in which a high speed startup is possible in a case where an OFF operation is performed on a power supply switch.

Description of the Related Art

There is a problem in that for image forming apparatuses and information processing apparatuses of recent years, it takes a long time, due to an increase in the number of functions in such apparatuses, before a user is actually able to operate the apparatus from when the user performs an operation (an ON operation) on a power supply switch. For this problem, there is a function referred to as suspend (a suspend mode) that puts the device in a state in which operation of currently executing programs is paused when the user performs an OFF operation on a power supply switch so that it is possible to revert back to the same operational state as the current operational state. Also, there is a function referred to as resume for starting up in an operational state from the point in time immediately preceding termination when the user performs an ON operation on a power supply switch, i.e. reverting to a state immediately preceding the point in time of termination. In other words, by using the functions as described above, a high speed startup becomes possible in an image forming apparatus such as a digital multifunction peripheral, and quickly reverting to the immediately preceding operational state becomes possible (Japanese Patent Laid-Open No. 2007-293806).

In an image forming apparatus equipped with devices such as a scanner, a printer, or the like, an arrangement is provided for forcibly turning off a power supply of a device such as a scanner, a printer, or the like, by an OFF operation on a power supply switch. There are cases in which an error is issued due to the power supply of a device, such as a scanner, a printer, or the like, being turned off forcibly, based on an operational state of a device, such as a scanner, a printer, or the like, when a power supply switch is turned off, and a suspend state is transitioned into. In such a case, normally, by notification between apparatuses of the state of the power supply switch, shutdown processing is executed without transitioning into the suspend state. By a system reset accompanying the shutdown processing, the above described error notification is reset, and thereby the image forming apparatus starts up normally. However, there are cases in which, due to the notification of the power supply switch state between apparatuses being delayed, the suspend state is transitioned into without it being possible to recognize the issued error as a misdetection error. In such a case, the apparatus reverts to the error state upon the next start up.

SUMMARY OF THE INVENTION

The present invention was conceived in view of these kinds of problems, and provides a technique for preventing a device from reverting in a state in which a misdetected error occurred by making a reservation such that a system reset is issued upon the next start up in a case where an error is issued from the device whose power supply is turned off forcibly due to an OFF operation on a power supply switch.

According to the first aspect of the present invention, there is provided an image forming apparatus comprising: a power supply switch; a control unit configured to transition the image forming apparatus into a suspend state when the power supply switch is turned off by an operation of a user; a device to which a power supply is stopped forcibly when the power supply switch is turned off by the operation of the user; and a notification unit configured to notify the control unit of an error that occurred on the device, wherein the control unit, in a case where the error is notified of by the notification unit, controls the image forming apparatus to revert from the suspend state and resets the image forming apparatus.

According to the second aspect of the present invention, there is provided a method of controlling an image forming apparatus having a power supply switch, and a device to which a power supply is stopped forcibly when the power supply switch is turned off by an operation of a user, the method comprising: a control step of transitioning the image forming apparatus into a suspend state when the power supply switch is turned off by an operation of a user; a notification step of notifying of an error that occurred on the device, wherein in the control step, in a case where the error is notified of in the notification step, the image forming apparatus is controlled to revert from the suspend state and the image forming apparatus is reset.

Further features of the present invention will become apparent from the following description of exemplary embodiments (with reference to the attached drawings).

BRIEF DESCRIPTION OF THE DRAWINGS

FIG. 6 is a flowchart for processing that the MFP control unit 12 performs.

DESCRIPTION OF THE EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

First Embodiment

Figure 1:
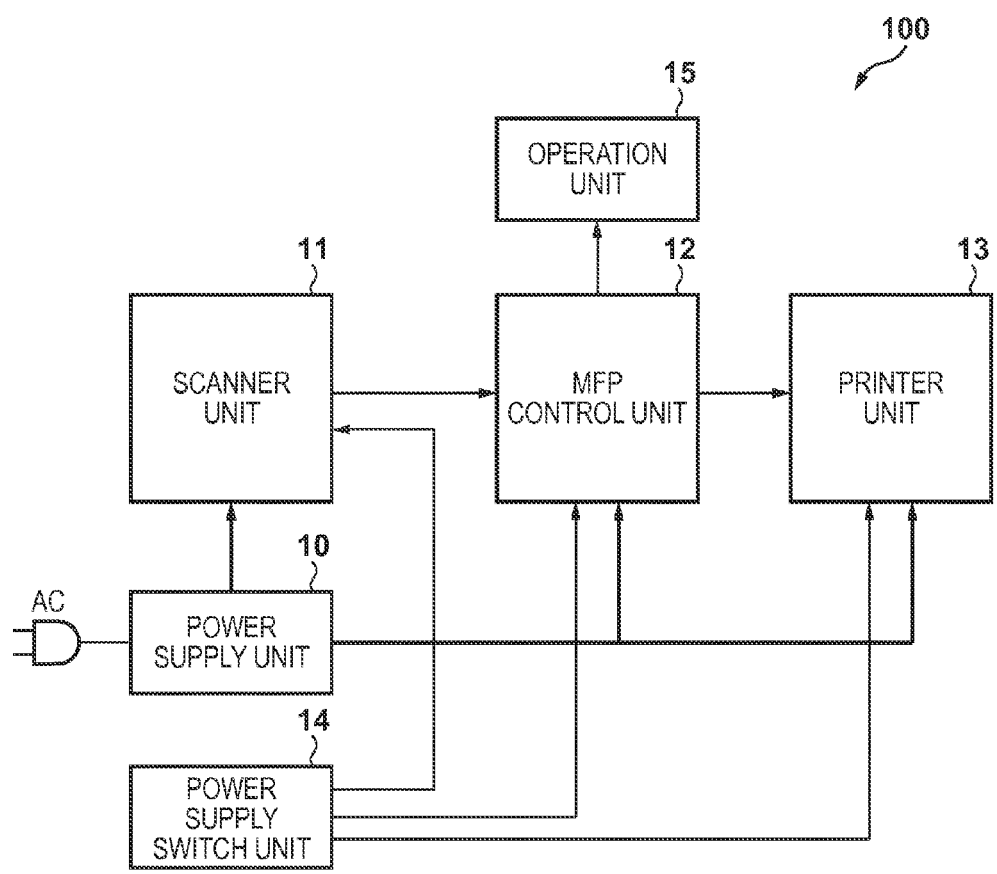
FIG. 1 is a block diagram for showing an overview configuration example for an image forming apparatus 100.

Firstly, explanation will be given using a block diagram of FIG. 1 for an overview configuration example for an image forming apparatus (image processing apparatus) 100 according to the present embodiment. The image forming apparatus 100 has the configuration shown in FIG. 1, is an MFP, and has multiple functions such as, for example, a scanner function, a print function, a copy function, or the like.

An MFP control unit 12 performs operation control on each unit that comprises in the image forming apparatus 100. A printer unit 13, in accordance with supplied print data, records an image, characters, or the like, on a recording medium (for example, recording paper) in a sheet form such as a sheet of paper in accordance with an electrophotographic method, for example. Of course, the print method of the printer unit 13 is not limited to a specific print method, and another recording method, such as, for example, an ink-jet method, a thermal transfer method, or the like, may also be employed. A scanner unit 11 optically reads information such as the images, characters, or the like, that are recorded on a recording medium of a sheet form such as a piece of paper (for example, recording paper), and obtains a result that is read as an image.

An operation unit 15 is comprised of a liquid crystal screen, hard keys, or the like, and a user uses the operation unit 15 in order to input various instructions, and also the operation unit 15 presents to the user various information by displaying it.

A power supply unit 10 supplies power to each of the scanner unit 11, the MFP control unit 12, and the printer unit 13. A power supply switch unit 14 is something that a user operates in order to perform switching ON/OFF of a power supply to each of the scanner unit 11, the MFP control unit 12, and the printer unit 13. The power supply switch unit 14 transmits a control signal indicating whether the power supply switch unit 14 is in an on state or an off state to each of the scanner unit 11, the MFP control unit 12 and the printer unit 13.

Figure 2:
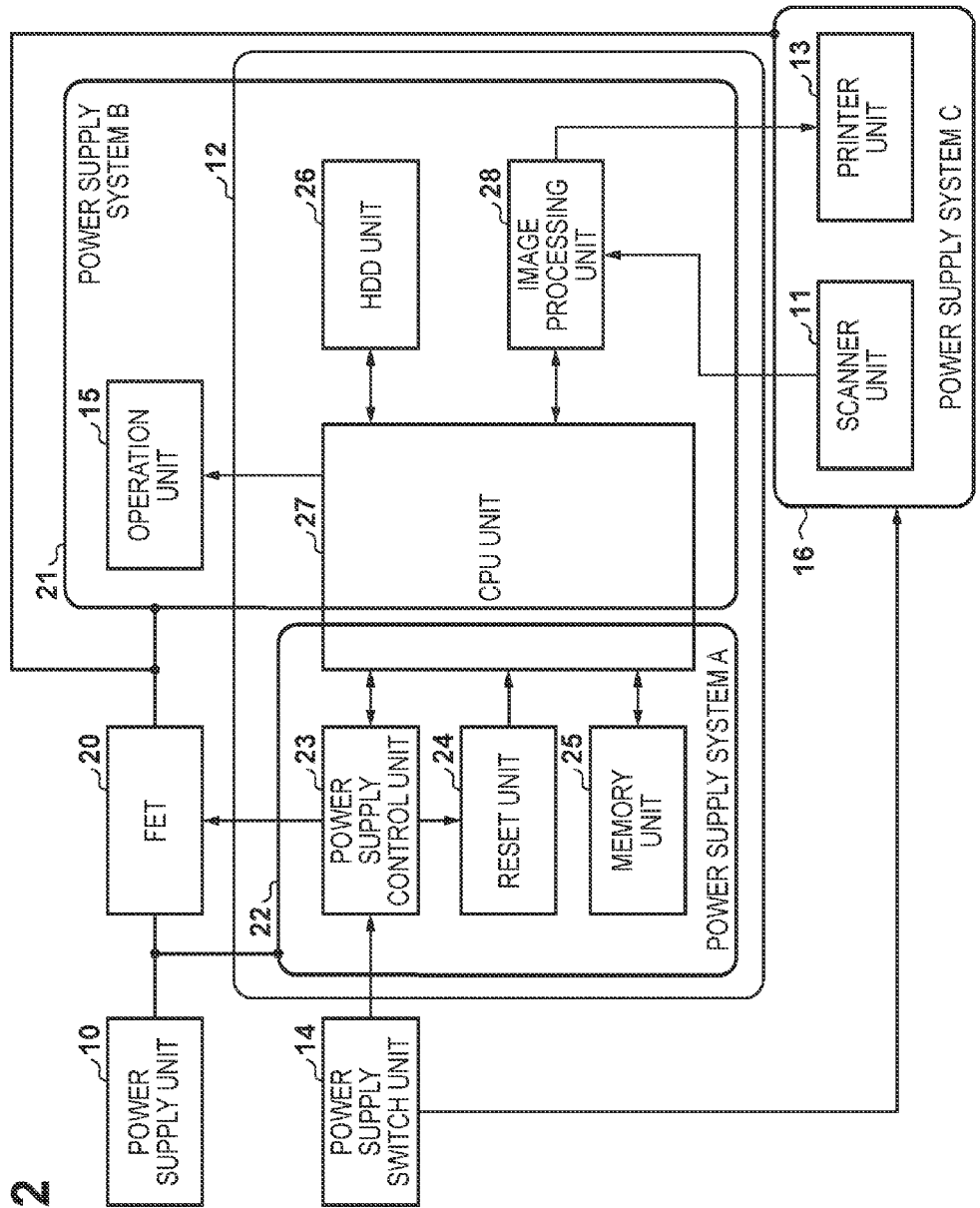
FIG. 2 is a view for showing an overview configuration for an MFP control unit 12 and peripheral devices.

Next, explanation will be given using FIG. 2 for an overview configuration for the MFP control unit 12 and its the peripheral devices.

A power supply control unit 23 receives a control signal from the power supply switch unit 14, and notifies a CPU unit 27 by an interrupt of the content that the control signal indicates (that an ON operation or an OFF operation was performed by the user on the power supply switch unit 14). Also, the power supply control unit 23 performs control to disconnect a power supply to part of the image forming apparatus 100 upon transition into a power saving mode, and to restart the power supply to the part upon reversion from the power saving mode.

The reset unit 24 causes the CPU unit 27, based on a control signal from the power supply control unit 23, to issue a reset to units comprised in the image forming apparatus 100, and to execute restart processing. An FET 20 is a switch for turning on/off a power supply to a power supply system B 21 and a power supply system C 16. The CPU unit 27 serves as a control unit for performing operation control of each unit comprised in the image forming apparatus 100. A memory unit 25 is a volatile memory such as one that is DDR, an SDRAM, or the like.

An image processing unit 28 compresses image data as a result that the scanner unit 11 read in, and performs image processing upon outputting of print data that is processed by the CPU unit 27 to the printer unit 13.

Figure 5:
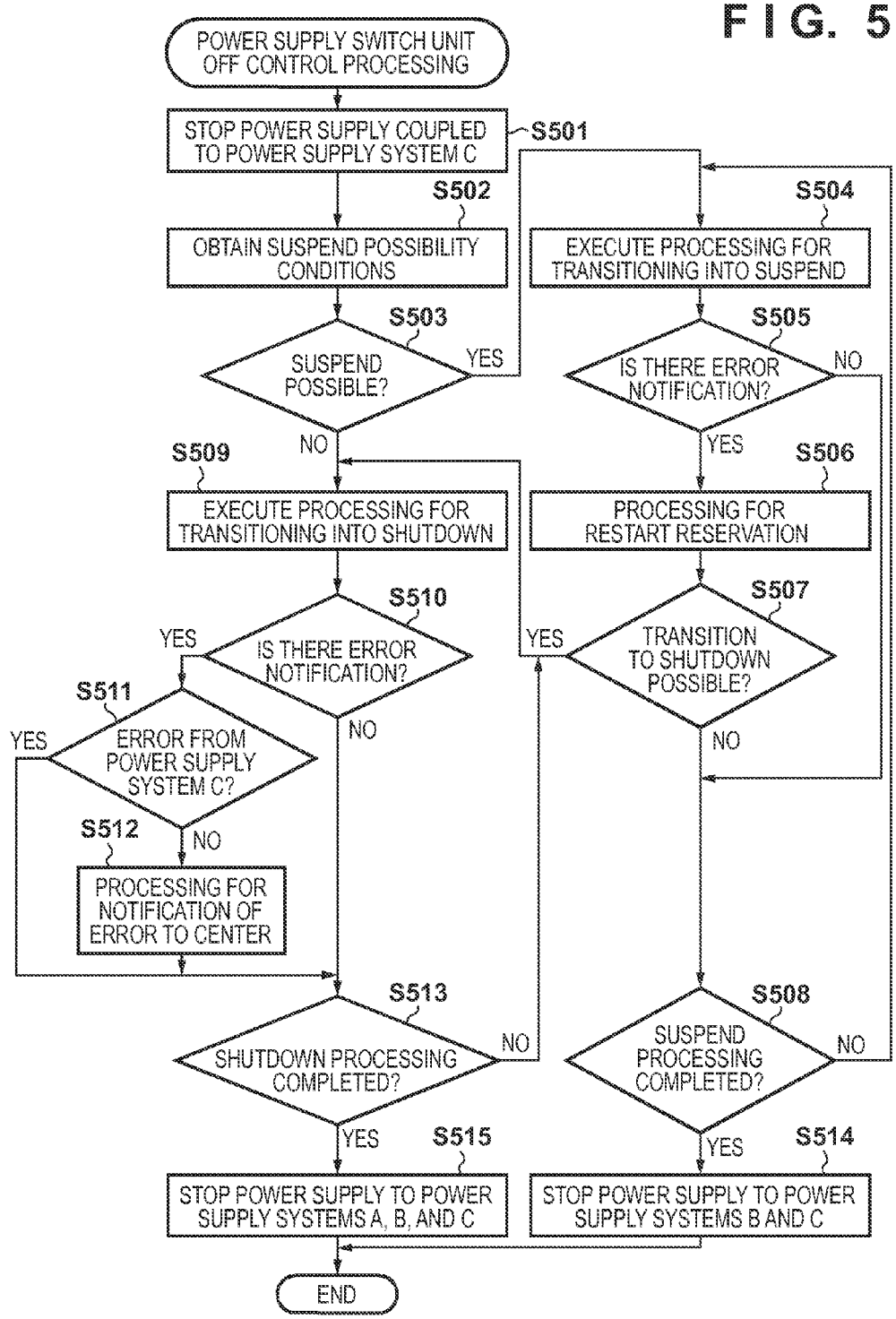
FIG. 5 is a flowchart for processing that the MFP control unit 12 performs.

An HDD unit 26 is an example of an external storage apparatus, and computer programs that cause the CPU unit 27 to execute (performed by the CPU unit 27) later explained processing (for example, the processing that the CPU unit 27 performs in the flowcharts of FIGS. 5 and 6, and data is stored in the HDD unit 26.

Next, explanation will be given for a power supply system of the MFP control unit 12. Note, in the present embodiment, a case in which a suspend method in which data is held in the memory unit 25 in a state in which a power consumption is lower than a normal power and a startup time is shorter is applied is illustrated; however, another method such as a hibernation method in which data is held in the HDD unit 26, for example, may be used.

The image forming apparatus 100, when an OFF operation on the power supply switch unit 14 is detected, determines whether to transition into the suspend state or whether to transition into a shutdown state. Then, the image forming apparatus 100, when next an ON operation is detected on the power supply switch unit 14, determines whether to transition into a resume state or whether to transition into a normal startup state in accordance with the previously described transition determination of the state of the image forming apparatus 100. An amount of power consumption of the image forming apparatus 100 in a suspend state is larger than the amount of power consumption of the image forming apparatus 100 in the shutdown state only by the amount for holding data in the memory unit 25. Meanwhile, the transition from the suspend state to the resume state upon a powering on can be performed at higher speed than the transition from the shutdown state to the normal startup state.

A power supply system A 22 is comprised of a part including the power supply control unit 23, the reset unit 24, the memory unit 25, and the CPU unit 27, and in order to realize management of the power supply state of the image forming apparatus 100 on the whole and reversion from the power saving mode, the power supply is not disconnected in any power saving mode.

The power supply system B 21 is comprised of a part of the CPU unit 27, the image processing unit 28, the HDD unit 26, and the operation unit 15. The power supply system C 16 is comprised of the scanner unit 11 and the printer unit 13. Controlling power supply/power supply disconnection with respect to the power supply system B 21 and the power supply system C 16 is realized by controlling the FET 20 by a control signal outputted from the power supply control unit 23.

In each of the later described driving units included in the power supply system C 16, the configuration is such that a control signal from the power supply switch unit 14 is input, and irrespective of the power supply control unit 23, the configuration is such that it is possible to disconnect the power supply to each driving unit.

Figure 3:
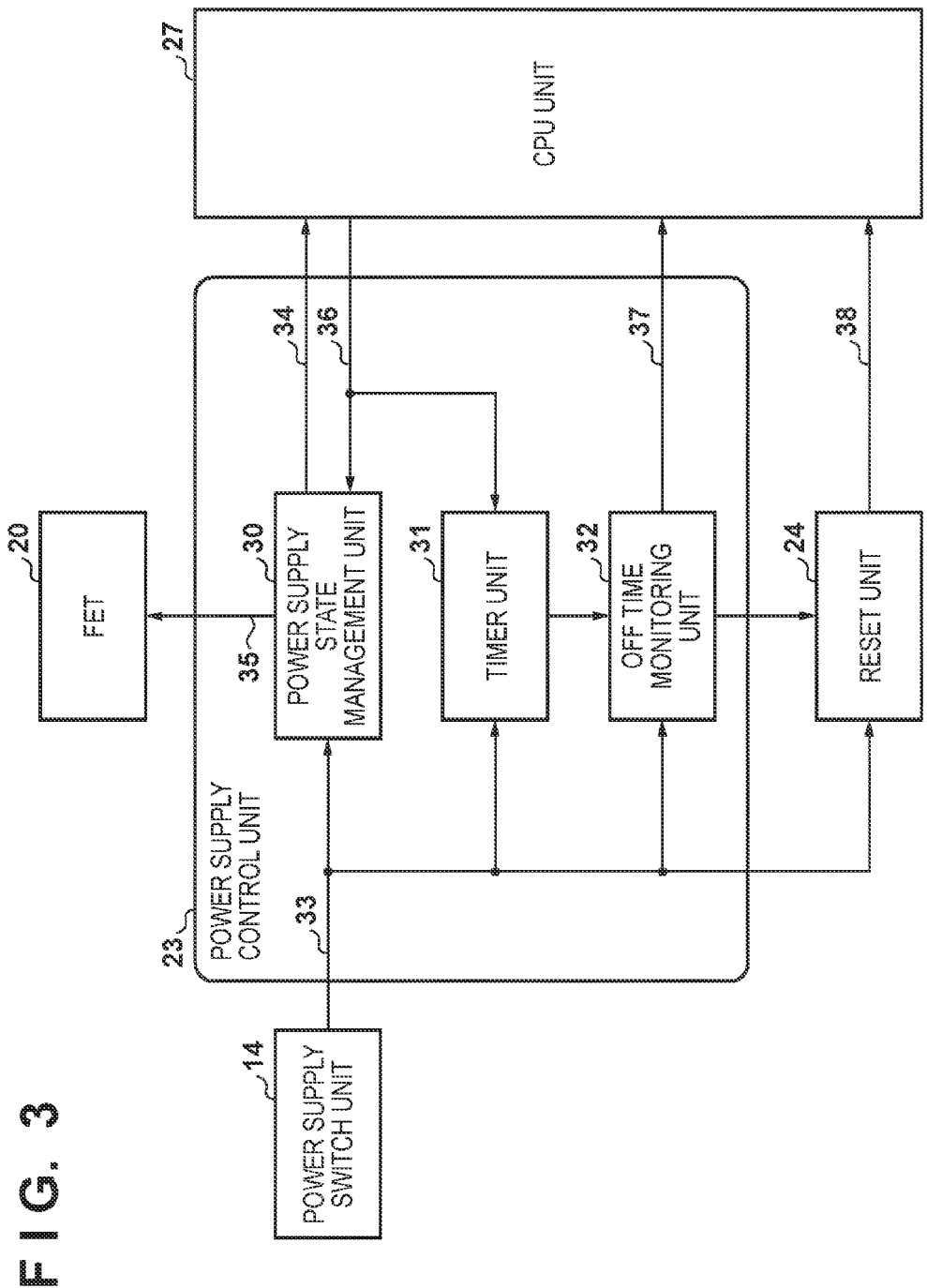
FIG. 3 is a view for showing an overview configuration for a power supply control unit 23 and peripheral devices.

Next, explanation will be given using FIG. 3 for an overview configuration for the power supply control unit 23 and its peripheral devices.

A power supply state management unit 30 determines whether an ON operation or an OFF operation was performed on the power supply switch unit 14 by a user from a control signal 33 which is received from the power supply switch unit 14, and the CPU unit 27 is notified of the result of the determination by an interrupt signal 34. The CPU unit 27, when it receives notification that an OFF operation was performed on the power supply switch unit 14, executes shutdown processing or processing for transitioning to a suspend state which is a state in which power consumption is lower and in which startup is faster than in a normal state. The CPU unit 27, when processing for transitioning to the suspend state, or the shutdown processing terminates, the power supply control unit 23 and a timer unit 31 are notified that the processing for transitioning into the suspend state or the shutdown processing has terminated by a processing termination signal 36.

The power supply state management unit 30, when it receives the processing termination signal 36, controls the FET 20 by a FET control signal 35, and causes the power supply to the power supply system B 21 and the power supply system C 16 to be disconnected. Note, in a case where the processing termination signal 36 indicates a termination of the shutdown processing, the power supply state management unit 30, in addition to causing the FET 20 to disconnect the power supply to the power supply system B 21 and the power supply system C 16, disconnects the power supply to the power supply system A 22.

Also, the power supply state management unit 30, when it receives notification that an ON operation was performed on the power supply switch unit 14, causes the power supply to the power supply system B 21 and the power supply system C 16 to be initiated by controlling the FET 20 by an FET control signal 35.

The timer unit 31 measures the time from when notification that an OFF operation was performed on the power supply switch unit 14 is received until the processing for transitioning into the suspend state or the shutdown processing has terminated.

An OFF time monitoring unit 32 monitors the time that the timer unit 31 measures. In a case where the length of the monitored time is greater than or equal to a predetermined length, i.e. the processing for transitioning into the suspend state or the shutdown processing does not terminate even though greater than or equal to a predetermined time has elapsed, the power supply state management unit 30 is caused to disconnect the power supply forcibly.

In a case where the user makes an operation to put the power supply switch unit 14 into the on state in order to revert from the suspend state, the power supply switch unit 14 notifies the OFF time monitoring unit 32 of something to that effect. However, the OFF time monitoring unit 32 notifies the CPU unit 27 by a resume signal 37 that the power supply switch unit 14 was operated to be put into the on state. The CPU unit 27, having received the resume signal 37, executes resume processing, which is processing for reverting from the suspend state, and causes the image forming apparatus 100 to revert to the state immediately preceding the power off operation. Also, in a case where the CPU unit 27 determines that a restart is necessary after the completion of the resume processing, it sends a signal to the reset unit 24 via the power supply state management unit 30. The reset unit 24 causes the CPU unit 27 based on the signal to issue a reset (38) to each unit comprised in the image forming apparatus 100 and to execute restart processing.

Figure 4:
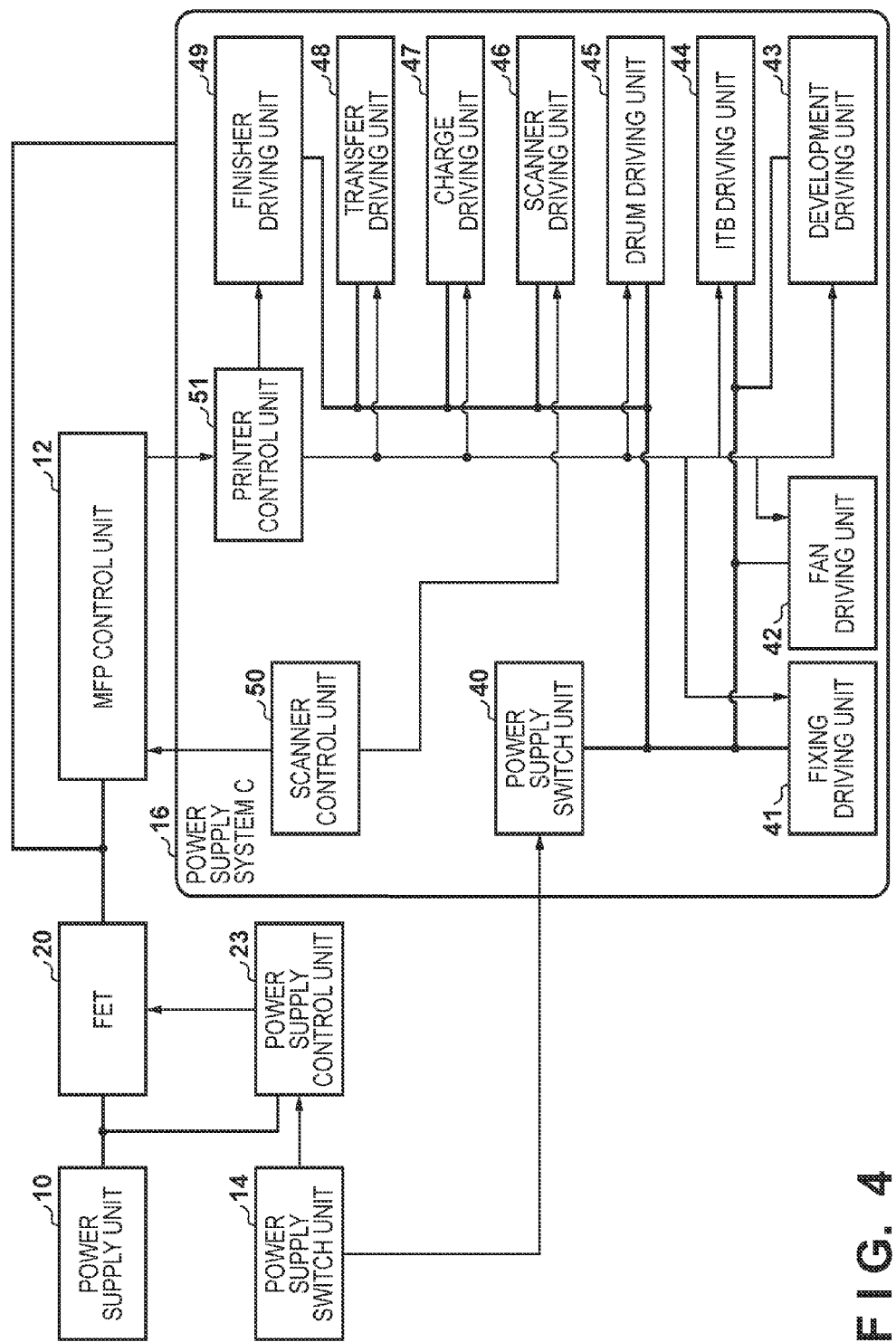
FIG. 4 is a view for showing an overview configuration for a power supply system C 16 and peripheral devices.

Next, explanation will be given using the block diagram of FIG. 4 for an overview configuration of parts included in the power supply system C 16 in the scanner unit 11 and the printer unit 13 and its peripheral devices. In FIG. 4, it is shown that the scanner unit 11 and the printer unit 13 are in a single body of an apparatus, but they may be separate apparatuses respectively. As described above, control of a power supply for the power supply system C 16 is performed by the FET 20.

A power supply switch unit 40, in accordance with a control signal received from the power supply switch unit 14, performs control of the power supply for each later described driving unit included in the power supply system C 16.

A scanner control unit 50 causes the scanner unit 11 to perform a scan operation by controlling a scanner driving unit 46, and in addition to supplying image data obtained by the scan operation to the image processing unit 28, notifies of a scanner state in the scanner unit 11.

The scanner driving unit 46 has a mechanical unit and a sensor unit, and causes the scanner unit 11 to be driven in accordance with control by the scanner control unit 50. A printer control unit 51 causes printing to be performed based on print data supplied from the CPU unit 27 by performing operation control on each unit related to later described image formation. A fixing driving unit 41 drives a fixing apparatus according to an instruction from the printer control unit 51.

The fan driving unit 42 drives a cooling fan for cooling the apparatus on the whole and a power supply unit according to an instruction from the printer control unit 51. A development driving unit 43 drives a developing unit for causing a toner to adhere on a drum according to an instruction from the printer control unit 51. An ITB driving unit 44 drives an intermediate transfer belt (ITB) unit for causing a toner attached on the drum to adhere according to an instruction from the printer control unit 51.

A drum driving unit 45 drives the drum to which the toner is caused to adhere according to an instruction from the printer control unit 51. A charge driving unit 47 drives a charging unit in order to cause the drum to have an electrostatic charge according to an instruction from the printer control unit 51. A transfer driving unit 48 drives a transfer unit to transfer a toner that is caused to adhere to the drum or the ITB according to an instruction from the printer control unit 51. A finisher driving unit 49 drives a finisher unit for performing shifting of a fixed sheet or stapling processing according to an instruction from the printer control unit 51.

When a user performs an OFF operation using the power supply switch unit 14, firstly, the power supply corresponding to the driving units in the power supply system C 16 is disconnected by the power supply switch unit 40. Then, after that, when the shutdown processing or the processing for transitioning to the suspend state in the CPU unit 27 has terminated, the power supply for the whole including the scanner control unit 50 and the printer control unit 51 is disconnected by the FET 20.

Next, explanation will be given using the flowchart of FIG. 5 for processing that the MFP control unit 12 performs in accordance with the user performing an operation to put the power supply switch unit 14 into the off state.

<Step S501>

When the user performs an operation to put the power supply switch unit 14 in the off state, the power supply control unit 23 and the power supply switch unit 40 detect the OFF operation from control signals transmitted from the power supply switch unit 14. Then, the power supply switch unit 40 causes the power supply for the driving units included in the power supply system C 16 to be disconnected.

<Step S502>

The power supply state management unit 30 notifies the CPU unit 27 by the interrupt signal 34 that the OFF operation was performed on the power supply switch unit 14. The CPU unit 27 collects information for determining whether or not the processing for transitioning into the suspend state is executable in accordance with receiving the interrupt signal 34, and registers the information to the HDD unit 26.

The collected information is information indicating whether or not there are various factors for which a cold boot is necessary such as a modification of network settings, or an application installation, for example, and using this information, it is determined whether or not the processing for transitioning into the suspend state is executable every predetermined time period.

<Step S503>

The CPU unit 27 determines whether or not the processing for transitioning into the suspend state is executable using the information collected in step S502. The result of the determination is that if the processing for transitioning into the suspend state is executable, the processing proceeds to step S504, and if execution is impossible, the processing proceeds to step S509.

<Step S504>

The CPU unit 27 executes the processing for transitioning into the suspend state.

<Step S505>

The CPU unit 27 determines whether or not a notification that an error occurred is received. The notification that an error occurred is performed by the scanner control unit 50 and the printer control unit 51 performing an inspection of each part in the scanner unit 11 and the printer unit 13 respectively, and if an error is found, transmitting something to that effect to the CPU unit 27 via the image processing unit 28. Then, in a case where the CPU unit 27 receives the notification that an error occurred, the processing proceeds to step S506, and if the CPU unit 27 does not receive the notification that an error occurred, the processing proceeds to step S508.

<Step S506>

The CPU unit 27 identifies the source of the error occurrence and the type of the error from the notification of the occurrence of the error, and registers information indicating the source of the occurrence of the error and the type of the error as restart reservation information to the memory unit 25.

<Step S507>

The CPU unit 27 interrupts the processing for transitioning to the suspend state in the current stage and determines whether or not the shutdown processing is executable. The determination is performed by determining whether the processing for transitioning to the suspend state has progressed to a predetermined state. The processing for transitioning into the suspend state proceeds through an input/output stopped stage, a device sleep stage, an application sleep stage, and a suspend stage in that order. Then, when the application sleep stage terminates in the current stage, it is determined that it is impossible to "interrupt the processing for transitioning into the suspend state in the current stage and execute the shutdown processing".

In a case where it is determined that the result of this determination is that it is possible to interrupt the processing for transitioning into the suspend state in the current stage and execute the shutdown processing, the processing proceeds to step S509. Meanwhile, in a case where it is determined that it is impossible to interrupt the processing for transitioning into the suspend state in the current stage and to execute the shutdown processing, the processing proceeds to step S508.

<Step S508>

The CPU unit 27 determines whether or not the processing for transitioning into the suspend state has completed. In a case where the result of this determination is that it has completed, the processing proceeds to step S514, and if it is that it has yet to be completed, the processing returns to step S504, and the processing for transitioning into the suspend state continues.

<Step S514>

The CPU unit 27 makes a notification functioning as the processing termination signal 36, that the processing for transitioning to the suspend state has been completed, to the power supply state management unit 30 in the power supply control unit 23. When the power supply state management unit 30 receives the processing termination signal 36, the FET 20 is controlled by the FET control signal 35, a power supply to the power supply system B 21 and the power supply system C 16 is disconnected, and transition into a suspend state is made. Note, in a case where transition to the suspend state is made, the memory unit 25 included in the power supply system A 22 continues to store a memory value (including restart reservation information) in a low-power state <Step S509>

The CPU unit 27 executes the shutdown processing.

<Step S510>

The CPU unit 27 determines whether or not a notification that an error occurred is received (upon the shutdown processing). The processing is the same as step S505. Then, in a case where the CPU unit 27 receives the notification that an error occurred, the processing proceeds to step S511, and if the CPU unit 27 does not receive the notification that an error occurred, the processing proceeds to step S513.

<Step S511>

The CPU unit 27 identifies the source of the error occurrence from the received notification of the occurrence of the error, and determines whether or not the identified source of the occurrence is an element included in the power supply system C 16, i.e. the scanner control unit 50 or the printer control unit 51.

In a case where the result of the determination is that the source of the error occurrence is the scanner control unit 50 or the printer control unit 51, the processing proceeds to step S513, and in a case where the source of the error occurrence is not the scanner control unit 50 or the printer control unit 51, the processing proceeds to step S512.

<Step S512>

The CPU unit 27 determines that an error occurrence for which notification is received is not for a power supply coupled error, and an error notification is made to a predetermined external device in a service center or the like. The content that is notified of is not limited to specific content, but for example may be details of the error or source of the error occurrence, identification information of the apparatus, a date and time of the error detection, or the like. Also, the method of notification of the error is not limited to a specific approach, but the error may be notified by an electronic mail.

<Step S513>

The CPU unit 27 determines whether or not the shutdown processing has been completed. In a case where the result of the determination is that the shutdown processing is completed, the processing proceeds to step S515, and in a case where the shutdown processing has yet to be completed, the processing returns to step S509, and the shutdown processing is continued.

<Step S515>

The CPU unit 27 makes a notification to the power supply state management unit 30 in the power supply control unit 23, by the processing termination signal 36, that the shutdown processing has been completed. When the power supply state management unit 30 receives the processing termination signal 36, controls the FET 20 using the FET control signal 35, disconnects the power supply to the power supply system A 22, the power supply system B 21, and the power supply system C 16, and transitions into the shutdown state.

Next, the processing performed (the resume processing) by the MFP control unit 12, when the power supply switch unit 14 of the image forming apparatus 100 which is in the suspend state by the processing described above is operated by a user and put in the on state, is explained using a flowchart in FIG. 6.

<Step S601>

When the user performs an operation to put the power supply switch unit 14 in the on state, the power supply state management unit 30 receives a notification that the ON operation is performed on the power supply switch unit 14, and in response to this, the FET 20 is controlled by the FET control signal 35, and the power supply to the power supply system B 21 and the power supply system C 16 is caused to initiate.

<Step S602>

The CPU unit 27 executes the resume processing, and reversion from the suspend state is performed. When the processing in step S602, i.e. the resume processing, is completed, the processing proceeds to step S603.

<Step S603>

The CPU unit 27 searches in the memory unit 25, and determining whether or not the restart reservation information is registered in the memory unit 25. In a case where the result of the determination is that the restart reservation information is registered in the memory unit 25, the processing proceeds to step S604, and in a case where the information is not registered, the processing is terminated in accordance with the flowchart in FIG. 6.

<Step S604>

The CPU unit 27 refers to the restart reservation information, identifies the source of the error occurrence (the source of error occurrence that occurred in the process of the processing for transitioning to the suspend state the previous time), and determines whether or not the source of the identified error occurrence is an element included in the power supply system C 16. In a case where the result of the determination is that the source of the error occurrence is the element included in the power supply system C 16, the processing proceeds to step S606, in a case where the source of the error occurrence is other than the element included in the power supply system C 16, the processing proceeds to step S605.

<Step S605>

The CPU unit 27 determines that the error that occurred in the process of the processing for transitioning into the suspend state the previous time is not a power supply coupled error, an error notification is performed to a predetermined external device in a service center or the like. The content that is notified of is not limited to specific content, but for example may be details of the error or source of the error occurrence, identification information of the apparatus, a date and time of the error detection, or the like. Also, the method of notification of the error is not limited to a specific approach, but the error may be notified by an electronic mail.

Note, in a case where the source of the error occurrence is an element included in the power supply system C 16, the processing described above in step S605 will be skipped because the detection of the error is determined to be a misdetection.

<Step S606>

The CPU unit 27 deletes the restart reservation information from the memory unit 25.

<Step S607>

The CPU unit 27 transmits a signal to the reset unit 24 through the power supply state management unit 30. The reset unit 24 causes the CPU unit 27 to issue, based on the signal, a reset (38) to each unit comprised in the image forming apparatus 100 and to execute restart processing.

In this way, according to the present embodiment, the information relating to the error detected upon the processing for transitioning into the suspend state is held in the memory unit 25 which is a volatile memory, and so is only valid only in a case where the resume processing is performed, and the image forming apparatus 100 can be caused to restart. Also, in a case where the processing for transitioning into the suspend state can be switched to the shut down sequence, by transitioning into the shutdown state, the image forming apparatus 100 starts up in a normal state the next time the power is turned on. Also, in a case where an error is detected after an OFF operation on the power supply switch unit 14, transitioning into the state where the function of the image forming apparatus 100 is possible can be made in a minimum amount of time without notifying of the misdetected error to a service center.

Second Embodiment

In the first embodiment, the memory unit 25 is included in the power supply system A 22 because explanation was given using the suspend method. It is also possible to use this approach as is for a hibernation method. In the hibernation method, a configuration is taken in which the memory unit 25 is placed in the power supply system B 21. Compared with the suspend method where the power supply of the power supply system B 21 is disconnected in a state in which data is held in the memory unit 25, a data transfer of contents of the memory unit 25 to the HDD unit 26 is performed before the power supply of the power supply system B 21 is disconnected in the hibernation method. Then, by performing the data transfer from the HDD unit 26 to the memory unit 25 upon the resume processing, an operation equivalent to the suspend method for which the HDD transfer time is slower can be performed without continuing the powering the memory unit 25 In other words, because the restart reservation information is held in the HDD unit 26, it becomes possible to apply the configuration explained in the first embodiment to the hibernation method as is.

Third Embodiment

In the first and second embodiments, explanation is given for the operation of the image forming apparatus 100 which comprises the scanner unit 11 and the printer unit 13, and devices having other configurations. However, if a first device, in an image processing apparatus comprising the first device and a second device, is operated as follows, any kind of devices may be used for the first device and the second device.

That is, when the first device detects an input of an instruction that the power of the image processing apparatus be turned off, the first device executes processing for transitioning into the suspend state, if it is executable, in order to disconnect the power supply to the second device, and executes the shutdown processing for the image processing apparatus if it is not executable. Then, in a case where an error has occurred upon the processing for transitioning into the suspend state, error information relating to the error is generated and is registered in the memory.

Then, when an input of an instruction that the power supply of the image processing apparatus be turned on is detected after a completion of the processing for transitioning into the suspend state, the resume processing is executed in order to revert the state of the image processing apparatus to the state immediately preceding the input of an instruction that the power supply be turned off. Then, after the resume processing, in a case where the error information is registered in the memory, the restart processing of the image processing apparatus is executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041943, filed Mar. 4, 2014, which is hereby incorporated by reference herein in its entirety.

What is claimed is:

1. An image forming apparatus comprising:
    a power supply switch;
    a controller configured to perform suspend process for causing the image forming apparatus to transition into a suspend state, in a case where the power supply switch is turned off by an operation of a user; a device to which a power supply is stopped forcibly in a case where the power supply switch is turned off by the operation of the user; and
    a device controller configured to notify the controller of an error that occurred, due to the stop of the power supply to the device forcibly, on the device,
    wherein the controller is configured to determine whether to interrupt the suspend process to perform shutdown process in a case where the error is notified of by the device controller in the suspend process,
    wherein the controller is configured to, in a case where the controller determines not to interrupt the suspend process to perform the shutdown process, continue to perform the suspend process to cause the image forming apparatus to transition into the suspend state while holding information relating the error,
    wherein the controller is configured to, in a case where (i) the power supply switch is turned on by the operation of the user while the image forming apparatus is in the suspend state and (ii) the image forming apparatus holds the information relating to the error which is already notified of by the device controller, control the image forming apparatus to resume from the suspend state and then perform a predetermined process based on the information relating the error, and
    wherein the controller is configured to, in a case where the controller determines to interrupt the suspend process to perform the shutdown process, interrupt the suspend process to perform the shutdown process.

2. The image forming apparatus according to claim 1,
    wherein the controller, in a case where the error is notified of by the device controller in the suspend process, stores the information, and
    wherein in a case where (i) the power supply switch is turned on by the operation of the user while the image forming apparatus is in the suspend state and (ii) the image forming apparatus holds the information, the controller controls the image forming apparatus to resume from the suspend state, determines a type of the stored information, and perform the predetermined process being based on the determined type of the stored information.

3. The image forming apparatus according to claim 1, wherein the controller, in a case where the error is notified of by the device controller in the suspend process, determines whether or not the interruption of the suspend process being in execution is possible, continues to perform the suspend process to cause the image forming apparatus to transition into the suspend state in a case where it is determined that the interruption of the suspend process being in execution is not possible, and interrupts the suspend process and performs the shutdown process to transition the image forming apparatus into a shutdown state in a case where it is determined that the interruption of the suspend process being in execution is possible.

4. The image forming apparatus according to claim 1, further comprising:
    a memory being capable of storing the information,
    wherein in the suspend state, a power is supplied to the memory.

5. The image forming apparatus according to claim 4, wherein
    in the shutdown state, a power supply to the memory is stopped.

6. A method of controlling an image forming apparatus having a power supply switch, and a device to which a power supply is stopped forcibly in a case where the power supply switch is turned off by an operation of a user, the method comprising:
    a control step of performing a suspend process for causing the image forming apparatus to transition into a suspend state, in a case where the power supply switch is turned off by an operation of a user;
    a notification step of notifying of an error that occurred, due to the stop of power supply to the device forcibly, on the device; and
    a determination step of determining whether to interrupt the suspend process to perform shutdown process in a case where the error is notified,
    wherein in a case where it is determined not to interrupt the suspend process to perform the shutdown process, continuing to perform the suspend process to cause the image forming apparatus to transition into the suspend state while holding information relating the error,
    wherein in the control step, in a case where (i) the power supply switch is turned on by the operation of the user while the image forming apparatus is in the suspend state and (ii) the image forming apparatus holds the information relating to the error which is already notified of in the notification step, the image forming apparatus is controlled to resume from the suspend state and then perform a predetermined process based on the information relating the error, and wherein in a case where it is determined to interrupt the suspend process to perform the shutdown process, interrupting the suspend process to perform the shutdown process.

7. The method of controlling the image forming apparatus according to claim 6, wherein in the control step, in a case where the error is notified of in the notification step, in the suspend process, the information is stored, and wherein in a case where (i) the power supply switch is turned on by the operation of the user while the image forming apparatus is in the suspend state and (ii) the image forming apparatus holds the information, in the control step, the image forming apparatus is controlled to resume from the suspend state, determine a type of the stored information, and perform the predetermined process based on the determined type of stored information.

8. The method of controlling the image forming apparatus according to claim 6, wherein in the control step, in a case where error is notified of in the notification step in the suspend process, it is determined whether or not the interruption of the suspend process being in execution the image forming apparatus is possible, wherein the image forming apparatus is transitioned into the suspend state in a case where it is determined that the shutting down is not possible, and wherein the image forming apparatus is transitioned into a shutdown state in a case where it is determined that the interruption of the suspend process being in execution is possible.

9. The method of controlling the image forming apparatus according to claim 6, wherein in the suspend state a power is supplied to a memory being capable of storing the information.

10. The method of controlling the image forming apparatus according to claim 9, wherein in the shutdown state, a power supply to a memory for storing a state of the image forming apparatus is stopped.

11. The image forming apparatus according to claim 1, wherein the device is a printer device configured to print an image on a sheet.

12. The image forming apparatus according to claim 1, wherein the device is a scanner device configured to scan an image on an original.

13. An image forming apparatus comprising:

a power supply switch;

a controller configured to perform a suspend process for causing the image forming apparatus to transition into a predetermined low power state where power is supplied to a part of the controller, according to a turn-off of the power supply switch by a user;

a printer device to which a supply of power is stopped according to the turn-off of the power supply switch by the user; and a printer device controller configured to control the printer device, to detect an error on the printer device, and to notify the controller of the detected error, wherein the controller is further configured to cancel the suspend process that is in execution and to perform a shutdown process based on the notification of the detected error from the printer device controller.

14. The image forming apparatus according the claim 13, wherein, in accordance with a turn-on of the power supply switch after the shutdown process, the image forming apparatus is configured to perform a cold-boot process.

15. The image forming apparatus according to claim 13, wherein the part of the controller includes a volatile memory, wherein the controller is configured to store, into the volatile memory, information relating to the error detected during the suspend process, wherein the image forming apparatus is configured to transition to the predetermined low power state, if the controller completes the suspend process and does not perform the shutdown process, and wherein the controller is configured to perform, when the image forming apparatus starts from the predetermined low power state according to a turn-on of the power supply switch, a process based on the information stored in the volatile memory.

16. The image forming apparatus according to claim 13, wherein the printer device drives a printing mechanism for printing an image on a sheet.

17. The image forming apparatus according to claim 13, wherein the printer device controller receives image data from the controller and controls the printer device to print an image based on the received image data.

18. The image forming apparatus according to claim 13, wherein power is not supplied to the printer device and the printer device controller in the predetermined low power state.

19. The image forming apparatus according to claim 13, wherein the controller includes a processor and a volatile memory used by the processor, and the part of the controller includes the volatile memory.

20. The image forming apparatus according to claim 13, further comprising:

a power supply controller configured to control power supply to the controller, wherein the controller instructs after the suspend process, the power supply controller to control power supply so that the image forming apparatus transitions into the predetermined low power state.

21. The image forming apparatus according to claim 20, wherein the power supply controller controls power supply to the printer device controller, and the controller instructs after the suspend process, the power supply controller to stop power supply to the printer device controller.

22. The image forming apparatus according to claim 13, further comprising:

a power supply controller configured to detect the turn-off of the power supply switch, and to control power supply to the controller and the printer device controller based on the detection; and another power supply switch configured to detect the turn-off of the power supply switch, and to stop power supply to the printer device based on the detection.

23. The image forming apparatus according to claim 22, wherein the another power supply switch stops power supply to the printer device based on the detection without control by the power supply controller.

24. The image forming apparatus according to claim 22, wherein the printer device controller is configured to to detect the error due to the stop of power supply to the printer device.

25. The image forming apparatus according to claim 13, wherein, after the shutdown process, the image forming apparatus transitions into a shutdown state where power consumption is lower than the predetermined low power state.

* * * * *